United States Patent [19]

Tokoro et al.

[11] Patent Number: 5,124,916
[45] Date of Patent: Jun. 23, 1992

[54] APPARATUS FOR CONTROLLING VEHICLE AUTOMATIC TRANSMISSION ACCORDING TO FUZZY SET THEORY

[75] Inventors: Setsuo Tokoro, Susono; Mitsuru Takada, Toyota, both of Japan

[73] Assignee: Toyota Jidosha Kabushiki Kaisha, Toyota, Japan

[21] Appl. No.: 565,150

[22] Filed: Aug. 10, 1990

[30] Foreign Application Priority Data

Aug. 24, 1989 [JP] Japan .................. 1-217836

[51] Int. Cl.$^5$ .............................. B60K 41/08
[52] U.S. Cl. ..................... 364/424.1; 74/866
[58] Field of Search ........... 364/424.1, 513; 74/866

[56] References Cited

U.S. PATENT DOCUMENTS

| | | | |
|---|---|---|---|
| 4,841,815 | 6/1989 | Takahashi | 364/424.1 |
| 4,842,342 | 6/1989 | Takahashi et al. | 303/102 |
| 4,947,331 | 8/1990 | Speranza | 364/424.1 |
| 4,958,288 | 9/1990 | Takahashi | 364/426.04 |
| 4,975,845 | 12/1990 | Mehta | 364/424.1 |
| 5,019,979 | 5/1991 | Takahashi | 364/424.1 |

Primary Examiner—Parshotam S. Lall
Assistant Examiner—V. N. Trans
Attorney, Agent, or Firm—Oblon, Spivak, McClelland, Maier & Neustadt

[57] ABSTRACT

An apparatus for controlling a vehicle automatic transmission having a plurality of operating positions, including a determining device for determining satisfaction degress of at least one basic fuzzy set theory rule corresponding to the respective operating positions of the transmission, based on a predetermined shift pattern, a first calculating device for calculating satisfaction degrees of fuzzy set control rules, corresponding to the respective operating positions of the transmission, depending upon a detected vehicle running condition, a second calculating device for calculating overall satisfaction degrees for selecting the respective operating positions, based on the calculated satisfaction degress of the basic fuzzy set theory rule or rules and the calculated satisfaction degrees of the fuzzy set control rules, and a selector for selecting one of the positions of the transmission, based on the calculated overall satisfaction degrees, so that the automatic transmission is shifted to the selected position.

10 Claims, 12 Drawing Sheets

FIG.2

| SHIFT LEVER POSI- TIONS | OPER- ATING POSI- TIONS | SOLENOIDS ||| CLUTCHES ||| BRAKES ||||  ONE-WAY CLUTCHES |||
|---|---|---|---|---|---|---|---|---|---|---|---|---|---|---|
| | | No.1 | No.2 | No.3 | C1 | C2 | C3 | B1 | B2 | B3 | B4 | F1 | F2 | F3 |
| D | 1st | O | X | X | O | O | | | | | | △ | | △ |
| | 2nd | O | O | ※ | O | O | | | | O | | △ | △ | |
| | 3rd | X | O | ※ | O | O | O | | | O | | △ | | |
| | O/D | X | X | ※ | | O | O | O | | | | | | |
| 2 | 1st | O | X | X | O | O | | | | | | △ | | △ |
| | 2nd | O | O | ※ | O | O | | | | O | | △ | △ | |
| | 3rd | X | O | ※ | O | O | O | | | O | | △ | | |
| L | 1st | O | X | X | O | O | | | O | | | △ | | △ |
| R | Rev | X | X | X | O | | O | | | | O | △ | | |
| P, N | | X | X | X | O | | | | | | O | △ | | |

APPARATUS FOR CONTROLLING VEHICLE AUTOMATIC TRANSMISSION ACCORDING TO FUZZY SET THEORY

BACKGROUND OF THE INVENTION

1. Field of the Invention

The present invention relates generally to an apparatus for controlling an automatic transmission of a motor vehicle, and more particularly to improvements in such a control apparatus adapted to shift the transmission from one of operating positions to another according to a predetermined shift pattern.

2. Discussion of the Related Art

A power transmitting system of a motor vehicle generally includes an automatic transmission which has a fluid coupling device such as a torque converter which receives power from an engine of the vehicle, and an automatic speed changing device such as a planetary mechanism connected to the fluid coupling device. The automatic transmission is controlled by a suitable control apparatus, such that the transmission is shifted from one of a plurality of operating positions thereof to another, according to predetermined shift patterns.

An example of a shift pattern for an automatic transmission having four forward drive positions is illustrated in FIG. 4. This shift pattern uses two control parameters, which consist of an accelerator position $\theta ac$ and a running speed V of the vehicle. Solid lines in FIG. 4 indicate boundaries for shift-up operations of the transmission which cause a decrease in the speed ratio of the transmission (input speed/output speed), while broken lines in the figure indicate boundaries for shift-down operations of the transmission which cause an increase in the speed ratio. Reference numerals and characters 1, 2, 3 and O/D denote the four operating positions of the transmission, i.e., first-speed position, second-speed position, third-speed position and overdrive position, respectively. The speed ratios of these first-speed, second-speed, third-speed and overdrive positions decrease in the order of description.

Where the transmission is currently placed in the third-speed position 3 with the accelerator position $\theta ac$ set at 40%, for example, three reference values V1, V2, V3 are determined by the shift pattern, so that the actually detected vehicle speed V is compared with these reference values V1 V2, V3, for selecting the position to which the transmission should be shifted up or down. Described more specifically, the first-speed position 1 is selected where $V \leq V1$, and the second-position 2 is selected where $V1 < V \leq V2$. The third-speed position 3 is selected where $V2 < V \leq V3$, and the overdrive position O/D is selected where $V3 < V$. The operating positions may be selected by comparing the detected accelerator position $\theta ac$ with reference values determined by the shift pattern for each vehicle speed V.

For improving the adequacy of selection of the optimum operating position of the automatic transmission, it is considered to adjust or compensate the basic shift pattern according to compensating data maps, or use a large number of shift patterns, so that the selected position of the transmission best suits the specific vehicle running condition which is defined by two or more parameters such as: a rate of change in the accelerator position $\theta ac$; a rate of change in the vehicle speed V; occurrence of repetition of frequent shift-up and shift-down actions of the transmission; a gradient of the road surface; a difference between the actual engine speed and the determined target or desired engine speed; and a steering angle of the vehicle. The compensation of the basic shift pattern or the use of many shift patterns permits optimum shifting operations of the transmission for enhanced driving comfort of the vehicle, depending upon the vehicle running condition. However, this arrangement which uses many control parameters requires a considerably increased amount of control program data (including data maps), and therefore requires a large-capacity memory for storing such data, resulting in an increase in the cost of the control apparatus. Namely, the required amount of control program data increases in proportion to the number of control parameters which is raised to n-th power.

In view of the above drawback, the assignee of the present application developed a transmission control apparatus as disclosed in U.S. Pat. application, Ser. No. 352,498 filed May 16, 1989. This control apparatus does not use shift patterns or compensating data maps, but is adapted to control the transmission, according to calculated degrees of satisfaction of predetermined fuzzy set control rules associated with running parameters of the vehicle. Namely, the satisfaction degrees of the control rules are calculated for each of the operating positions of the transmission, and the operating position having the highest satisfaction degree is selected as the position which best suits the current running condition of the vehicle. In this arrangement, the required amount of control program data is proportional to the number of the control parameters (vehicle running parameters), and is therefore comparatively small, whereby the control apparatus may be simplified and available at a relatively reduced cost.

In the above arrangement, however, the required amount of control program data is larger than that in the arrangement using only the shift patterns, in the case where the number of control parameters for selecting the operating positions of the transmission is relatively small, for example, where only the accelerator position and the vehicle speed are used as the control parameters. Thus, the conventional and recently proposed arrangements are not completely satisfactory in terms of the control reliability and simplicity.

SUMMARY OF THE INVENTION

It is therefore an object of the present invention to provide an apparatus for controlling an automatic transmission of a motor vehicle, with a relatively reduced amount of control program data.

The above object may be achieved according to the principle of the present invention, which is adapted to select one of operating positions of the transmission, by utilizing both a shift pattern and determination according to the fuzzy set theory.

More particularly, the present invention provides an apparatus for controlling an automatic transmission for a motor vehicle having a plurality of operating positions such that the operating positions are selected according to a predetermined shift pattern, comprising: (a) determining means for determining satisfaction degrees of at least one basic fuzzy set theory rule corresponding to the plurality of operating positions of the transmission, respectively, based on the predetermined shift pattern; (b) detecting means for detecting a running condition of the vehicle; (c) first calculating means for calculating satisfaction degrees of fuzzy set control rules, corresponding to the plurality of operating positions, respectively, depending upon the running condition of the vehicle detected by the detecting means; (d) second calculating means for calculating overall satisfaction degrees for selecting the plurality of operating positions, respectively, based on the satisfaction degrees of the at least one basic fuzzy set theory rule determined by the determining means and the satisfaction degrees of the fuzzy set control rules calculated by the first calculating means; and (e) selecting means for selecting one of the plurality of operating positions of the transmission, based on the overall satisfaction degrees calculated by the second calculating means, so that the automatic transmission is shifted to the selected operating position.

In the control apparatus of the present invention constructed as described above, the satisfaction degrees of the basic fuzzy set theory rule or rules are determined by the determining means, for the individual operating positions of the transmission, based on the predetermined shift pattern. In the meantime, the satisfaction degrees of the fuzzy set control rules associated with the running parameters of the vehicle which collectively determine the vehicle running condition are calculated by the first calculating means, for the respective operating positions of the transmission. Based on the determined satisfaction degrees of the fuzzy set theory rule or rules and the calculated satisfaction degrees of the fuzzy set control rules, the overall satisfaction degrees for selecting the individual operating positions of the transmission are determined by the second calculating means, so that the selecting means selects one of the operating positions of the transmission, based on the calculated overall satisfaction degrees. For example, one of the operation positions which has the highest overall satisfaction degree is selected as the optimum position to which the transmission is shifted or in which the transmission is maintained. The present arrangement permits the transmission to be shifted up and down, so as to meet a wide variety of running parameters of the vehicle, which cannot be dealt with by the known arrangement wherein the shift pattern is determined by the accelerator position and the vehicle speed, for example.

The present control apparatus which utilizes both the shift pattern and the fuzzy set theory requires a reduced amount of control program data, as compared with ar arrangement which uses many shift patterns or pattern compensating maps, to control the transmission depending upon the running parameters of the vehicle, even where the number of the parameters is relatively large.

Further, since the basic shift pattern is used (since the satisfaction degrees of the basic fuzzy set theory rule or rules are determined according to the basic shift pattern), the required overall amount of control program data is smaller in the present arrangement, than in the arrangement which uses only the fuzzy set theory to select the optimum position of the transmission.

In the present control apparatus, the overall satisfaction degree for selecting each of the operating positions of the transmission is calculated based on the basic shift pattern (satisfaction degree of the basic fuzzy set theory rule or rules) and the satisfaction degree of the appropriate fuzzy set control rule associated with the running condition of the vehicle. This arrangement does not require a procedure otherwise required for improving the control accuracy, as practiced in the arrangement wherein the shift pattern is compensated by obtaining the center of distribution of the calculated satisfaction degrees of the fuzzy set control rules. In this respect, too, the present control apparatus reduces the required amount of the control program data.

In one form of the present invention, the determining means provisionally selects one of the operating positions of the transmission as a provisional position $N^*$ according to the predetermined shift pattern, and the at least one basic fuzzy set theory rule consists of a basic fuzzy set theory rule whose satisfaction degree decreases with a difference in the number of positions between the selected provisional position $N^*$ and each of the operating positions. For example, the value of the satisfaction degree of the basic fuzzy set theory rule of the selected provisional position $N^*$ is set to "1", and those of the operating positions adjacent to the provisional position $N^*$ are set to "0.5", while the values of the positions next adjacent to the positions whose value is "0.5" are set to "0.25". Namely, the basic fuzzy set theory rule determines a degree in which each of the operating positions of the transmission is close to the determined provisional position.

In another form of the invention, the determining means determines satisfaction degrees of two or more basic fuzzy set theory rules, for example, a first basic fuzzy set theory rule Q1 for determining a degree in which each of the operating positions is close to the provisional position $N^*$, a second basic fuzzy set theory rule Q2 for determining a degree in which each operating position is more or less close to the provisional position $N^*$, and a third basic fuzzy set theory rule Q3 for determining a degree in which each operating position is very close to the provisional position $N^*$.

In a further form of the invention, the fuzzy set control rules whose satisfaction degrees are calculated by the first calculating means are formulated so as to control the transmission, depending upon various running parameters of the vehicle, such as: a rate of change in the accelerator pedal position (a rate of change in the throttle valve opening); a rate of change in the vehicle speed; occurrence of frequently repeated alternate shift-up and shift-down actions of the transmission; a gradient of the road surface; a difference between the actual engine speed and the determined target or desired engine speed; and a steering angle of the vehicle. The fuzzy set control rules for determining the adequacy of selecting the individual operating positions are selected depending upon the number of positions between each operating position and the currently established position.

For instance, the fuzzy set control rules may consist of a first control rule R1 for checking the running condition to determine whether the transmission should be maintained in a currently established position, a second control rule R2 for checking the running condition to determine whether the transmission should be shifted up one position from the currently established position, a third control rule R3 for checking the running condition to determine whether the transmission should be shifted up by two or three positions from the currently established position, and a fourth control rule R4 for checking the running condition to determine whether the transmission is shifted down by one position or two or three positions from the currently established position. These first, second, third and fourth control rules R1, R2, R3 and R4 may be formulated as follows: R1=A and B and C; R2=A and B' and C and {(D and E) or (F and G)}; R3=A and B' and C and F and G; and R4=A and B' and C and (D or H), where "A"

represents a sub-rule A for determining a degree in which the transmission is capable of providing a determined desired vehicle drive torque $T_D^*$, "B" represents a sub-rule B for determining a degree in which a presumed speed Ne' of an engine output shaft of the vehicle is close to a determined desired value Ne*, "B'" represents a sub-rule B' for determining a degree in which the presumed speed Ne' is very close to the desired value Ne*, "C" represents a sub-rule C for determining a degree in which the presumed speed Ne' falls within a permissible range, "D" represents a sub-rule D for determining a degree in which an accelerator pedal is kept at a constant position, "E" represents a sub-rule E for determining a degree in which a time T after a last shifting action of the transmission is long, "F" represents a sub-rule F for determining a degree in which the accelerator pedal is rapidly released, "G" represents a sub-rule G for determining a degree in which a steering angle of the vehicle is small, and "H" represents a sub-rule H for determining a degree in which the accelerator pedal is rapidly depressed.

Alternatively, the fuzzy set control rules may be incorporated in respective complex control rules which include at least one basic fuzzy set theory rule. For example, the complex control rules consist of a first complex control rule RI for checking the running condition to determine whether the transmission should be maintained in a currently established position, a second complex control rule RII for checking the running condition to determine whether the transmission should be shifted up one position from the currently established position, a third complex control rule RIII for checking the running condition to determine whether the transmission should be shifted up by two or three positions from the currently established position, a fourth complex control rule RIV for checking the running condition to determine whether the transmission is shifted down by one position from the currently established position, and a fifth complex control rule RV for checking the running condition to determine whether the transmission is shifted down by two or three positions from the currently established position.

The complex control rules RI-RV may include one of the basic fuzzy set theory rules such as the rules Q1, Q2 and Q3 as described above, and one of the sub-rules D-H described above with respect to the fuzzy set control rules R1-R4, and a sub-rule I for determining a degree in which the accelerator pedal is placed at the non-operated position (corresponding to the fully closed position of the throttle valve).

The fuzzy set control rules may include suitable sub-rules for adjusting or modifying the shift pattern, depending upon the type of the vehicle, load acting on the vehicle, specifications of the engine, and driver's desire or taste concerning the drivability of the vehicle. Further, some of the running parameters of the vehicle except for those (e.g., accelerator pedal position and vehicle speed) used for the shift pattern need not be covered by the fuzzy set control rules but may be dealt with by modifying the shift pattern or using two or more different shift patterns.

The values of the satisfaction degrees of the basic fuzzy set theory rule(s) and fuzzy set control rules (and their sub-rules) are "1" when the rules are completely satisfied, and are "0" when the rules are not satisfied at all. Usually, the values between "1" and "0" indicate the degree in which the rules are satisfied. However, the satisfaction degrees may take only two values, i.e., either "1" or "0".

The second calculating means may be adapted to calculate the overall satisfaction degrees by obtaining an algebraic product of the satisfaction degrees of the at least one basic fuzzy set theory rule determined by the determining means and the satisfaction degrees of the fuzzy set control rules calculated by the first calculating means. The selecting means is usually adapted to select one of the operating positions of the transmission, whose overall satisfaction degree is the highest of all the overall satisfaction degrees calculated by the second calculating means.

In the case where the fuzzy set theory rule or rules is/are included in the complex control rules, the satisfaction degrees of the complex control rules represent the overall satisfaction degrees for selecting the respective operating positions of the transmission. In this case, it may be considered that single calculating means serves as the first and second calculating means.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 2 is a view indicating operating states of solenoid coils and coupling elements of the automatic transmission of FIG. 1, in relation to operating positions of the transmission;

DETAILED DESCRIPTION OF THE PREFERRED EMBODIMENTS

Figure 1:
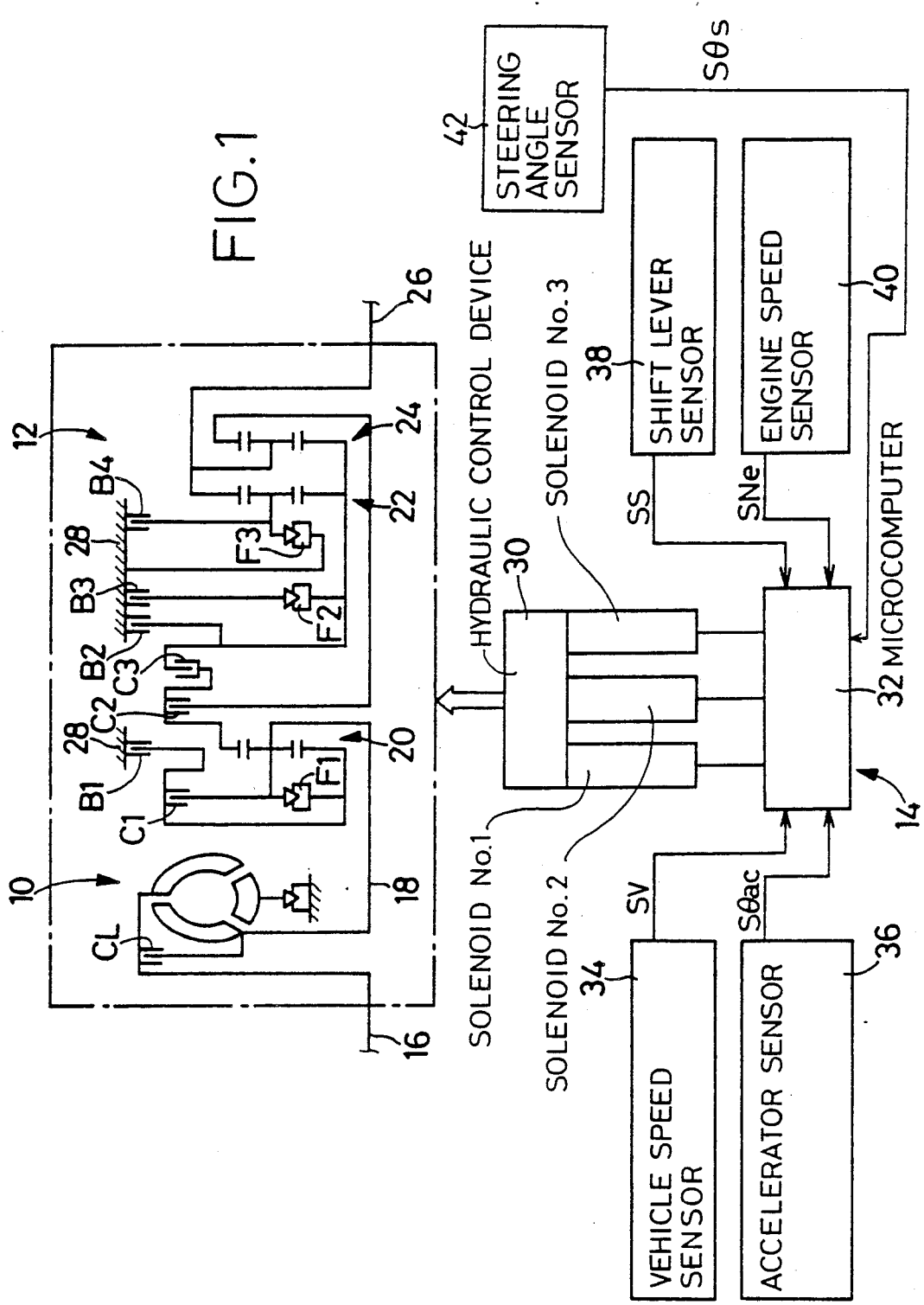
FIG. 1 is a schematic view showing a vehicle automatic transmission, and a control system which incorporates one embodiment of a control apparatus of the invention for controlling the transmission.

Referring first to FIG. 1, there is shown a part of a power transmitting system of a motor vehicle, which includes an automatic transmission to which the present invention is applicable. The automatic transmission includes a torque converter 10 and a planetary gear mechanism 12. The automatic transmission 10, 12 is controlled by a control apparatus 14 constructed according to the present invention.

The torque converter 10 has a pump impeller connected to an output shaft 16 of an engine of the vehicle, and a turbine impeller connected to an input shaft 18 of the planetary gear mechanism 12. A lock-up clutch CL is provided for selectively coupling the output shaft 16 and the input shaft 18.

The planetary gear mechanism 12 includes a first, a second and a third single-pinion type planetary gear unit 20, 22, 24. The first gear unit 20 is connected to the input shaft 18, while the second and third gear units 22, 24 are connected to an output shaft 26 of the gear mechanism 12. The output shaft 26 is linked with drive wheels of the vehicle via a differential gear device. The first, second and third planetary gear units 20, 22, 24 have the following component members: members which are integrally fixed to each other; members which are selectively connected to each other by means of three clutches C1, C2 and C3; members which are selectively fixed to a housing 28 of the transmission by means of four brakes B1, B2, B3 and B4; and members which are selectively connected to each other or fixed to the housing 28, by means of three one-way clutches F1, F2, F3, depending upon the direction of rotation of the driving members.

The clutches C1, C2, C3 may be a multiple-disk clutch, and the brakes B1, B2, B3, B4 may be a band brake having a single band, or two bands whose winding directions are opposite to each other. These clutches and brakes are operated, i.e., engaged and disengaged, by suitable hydraulic actuators which are controlled by the control apparatus 14, so that the automatic transmission (planetary gear mechanism 12) is shifted from one operating position to another so as to change the speed ratio, i.e., speed of the input shaft 18/speed of the output shaft 26. As indicated in FIG. 2, the planetary gear transmission 12 has four forward drive positions 1ST (first-speed position), 2ND (second-speed position), 3RD (third-speed position) and O/D (overdrive position), and one reverse drive position (Rev). The speed ratio of the transmission 10, 12 (planetary gear mechanism 12) decreases in steps as the transmission is shifted up in the direction from the first-speed position 1ST toward the overdrive position O/D.

In FIG. 1, only a half of the transmission 10, 12 on one side of the axis of rotation is shown, because the two halves are completely symmetric with each other, with respect to the rotation axis.

The control apparatus generally indicated at 14 in FIG. 1 includes a hydraulic control device 30 having control valves, and a microcomputer 32 for controlling the operation of the hydraulic control device 30. The hydraulic control device 30 are equipped with three solenoid coils No. 1, No. 2 and No. 3. The coils Nos. 1 and 2 are selectively energized or deenergized to operate the clutches C1–C3 and brakes B1–B4, so as to selectively establish the operating positions of the transmission. On the other hand, the coil No. 3 is used to operate the lock-up clutch CL for directly connecting the input shaft 18 of the planetary gear mechanism 12 to the output shaft 16 of the engine, when needed.

To the microcomputer 32, there are connected a vehicle speed sensor 34, an accelerator sensor 36, a shift lever sensor 38, an engine speed sensor 40 and a steering angle sensor 42. The vehicle speed sensor 34 generates a VEHICLE SPEED signal SV indicative of a running speed V (km/h) of the vehicle. The accelerator sensor 36 generates an ACCELERATOR POSITION signal $S\theta ac$ indicative of a currently established operating position $\theta ac$ of an accelerator pedal (corresponding to an angle of opening of a throttle valve of the engine). The shift lever sensor 38 generates a SHIFT LEVER POSITION signal SS indicative of a currently selected operating position of a shift lever. The engine speed sensor 40 generates an ENGINE SPEED signal SNe indicative of a speed Ne of the engine output shaft 16. The steering angle sensor 42 generates a STEERING ANGLE signal $S\theta s$ indicative of a currently established steering angle $\theta s$ of the steering wheel. The sensors 34, 36, 38, 40, 42 are provided by commonly used detecting means such as angular velocity detectors.

The shift lever of the vehicle has a total of six operating positions D (drive), 2 (second), L (low), R (reverse), P (parking) and N (neutral). In the drive position D, the transmission 10, 12 is selectively placed in one of the four positions b 1ST, 2ND, 3RD and O/D. In the second position 2, the transmission is selectively placed in one of the three positions 1ST, 2ND and 3RD.

The microcomputer 32 incorporates a read-only memory which stores various control data and control programs, a random-access memory for temporarily storing data, and a central processing unit for controlling the solenoid coils Nos. 1, 2 and 3 for operating the clutches C1–C3 and brakes B1–B4 and the lock-up clutch CL, according to the control programs stored in the read-only memory, and based on the control data stored in the read-only memory, depending upon the running condition of the vehicle, while utilizing the temporary data storage function of the random-access memory. The control data stored in the read-only memory include: shift pattern data for shifting the planetary gear mechanism 12; fuzzy set theory rules whose degrees of satisfaction are determined for the respective operating positions of the transmission, based on the shift pattern data; control rules for determining the next selected operating position of the transmission, according to the determined satisfaction degrees of the fuzzy set theory rules, depending upon the running condition of the vehicle; and shift pattern data for operating the lock-up clutch CL.

The table in FIG. 2 indicates the operating states of the solenoid coils Nos. 1, 2 and 3, clutches C1–C3, brakes B1–B4 and one-way clutches F1–F3, in relation to the operating positions of the shift lever and the operating positions of the transmission 10, 12 (planetary gear mechanism 12). Marks "o" and "x" associated with the solenoid coils indicate the energized and deenergized states of the coils, respectively. Mark "*" indicates the energization of the coils only when the lock-up clutch CL is engaged. Marks "o" associated with the clutches C1–C3 indicate the engaged state of the clutches, while the absence of the mark "o" indicates the disengaged or released state of the clutches. Marks "Δ" associated with the one-way clutches F1–F3 indicate the engagement of the one-way clutches when power is transmitted in the direction from the engine toward the vehicle drive wheels. The absence of the marks "∓Δ" indicates the released state of the one-way clutches.

Referring next to the flow chart of FIG. 3, there will be described an operation of the control apparatus 14 for shifting the transmission 10, 12 with the shift lever placed in the drive position D, for illustrative purpose only.

Initially, the control flow executes step S1 to determine a provisional position $N^*$ to which the transmission is shifted from the currently established position N. This determination is effected according to the stored shift pattern, and based on the detected accelerator pedal position $\theta ac$ and the detected vehicle speed V. The shift pattern for the drive position D of the shift lever is different from that for the second position 2. The shift patterns are determined, with the vehicle speed V and accelerator pedal position $\theta ac$ used as parameters representative of the vehicle running condition. An example of the shift pattern for the drive position D is illustrated in a rectangular coordinate system of FIG. 4, wherein the vehicle speed V and accelerator pedal position $\theta ac$ are taken along one and the other of the mutually perpendicular two axes. Stepped solid lines superposed on the coordinate system indicate shift-up boundaries across which the transmission is shifted up, while stepped broken lines indicate shift-down boundaries across which the transmission is shifted down.

Figure 4:
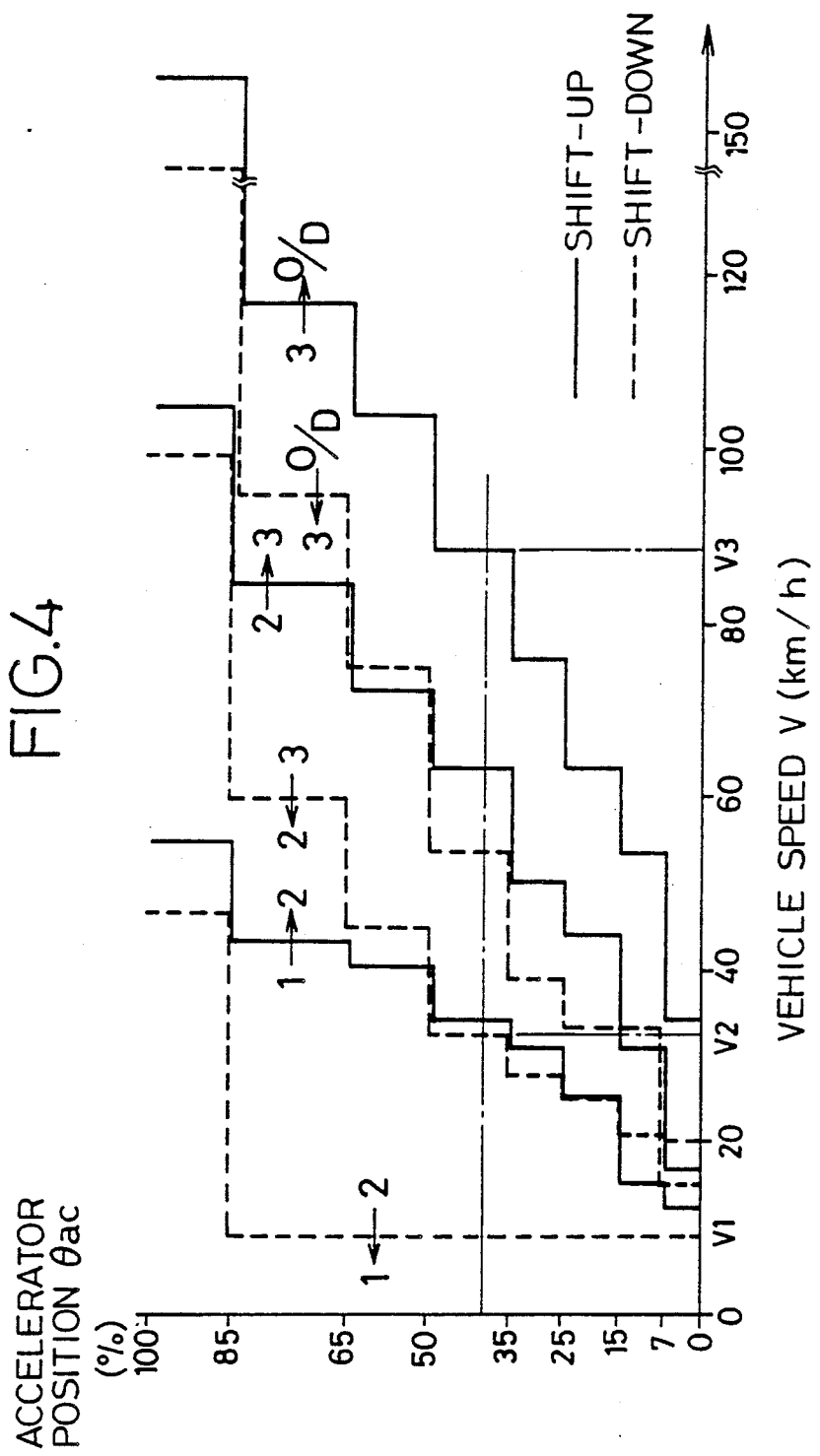
FIG. 4 is a diagram showing an example of shift control pattern used by the control apparatus for shifting the transmission of FIG. 1.

According to the shift pattern, three reference vehicle speeds V1, V2 and V3 are determined based on the currently established position N of the transmission and the current accelerator pedal position $\theta ac$. The provisional position $N^*$ of the transmission which is provisionally selected as the position to be selected next is determined by comparing the currently detected vehicle speed V with those reference speeds V1, V2 and V3. In FIG. 4, the three reference speeds V1, V2 and V3 are those where the transmission 10, 12 is currently placed in the third-speed position 3RD while the accelerator pedal position $\theta ac$ is 40%. If the currently detected vehicle speed V is equal to or lower than the first reference speed V1, the first-speed position 1ST is selected as the provisional position $N^*$. If the current vehicle speed V is higher than the first reference speed V1 and is equal to or lower than the second reference speed V2, the second-speed position 2ND is selected as the provisional position $N^*$. If the current vehicle speed V is higher than the second reference speed V2 and is equal to or lower than the third reference speed V3, the third-speed position 3RD is selected as the provisional position $N^*$. The overdrive position O/D is selected as the provisional position $N^*$ if the current vehicle speed V is higher than the third reference value V3.

The currently established position N of the transmission 10, 12 (planetary gear mechanism 12) is detected based on the output signals applied to the solenoid coils Nos. 1 and 2. The accelerator pedal position $\theta ac$ and the vehicle speed V are detected based on the ACCELERATOR POSITION signal $S\theta ac$ and VEHICLE SPEED signal SV. In the following description, it is assumed that the currently established position N and the determined provisional position $N^*$ are both the third-speed position 3RD.

Figure 5:
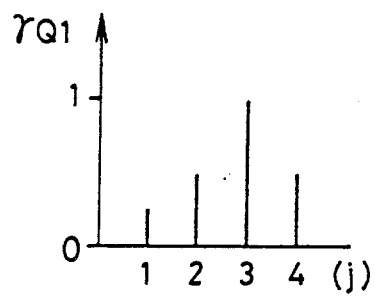
FIG. 5 is a view illustrating an example of degrees of satisfaction of a fuzzy set theory rule for the respective operating positions of the transmission, which are determined in step S2 of the flow chart of FIG. 3.

Step S1 is followed by step S2 in which degrees of satisfaction $\gamma Q1(j)$ of a basic fuzzy set theory rule Q1 are determined for the four operating positions 1ST, 2ND, 3RD and O/D of the transmission, where $j = 1, 2, 3, 4$ corresponding to the four operating positions. The fuzzy set theory rule Q1 is determined depending upon whether each of the selectable operating position of the transmission is close to the determined provisional position $N^*$, that is, depending upon the number of positions between the provisional position $N^*$ and each selectable position. For example, the satisfaction degree $\gamma Q1(j)$ for the provisional position $N^*$ is equal to 1, and the satisfaction degrees $\gamma Q1(j)$ for the positions $N^* \pm 1$ adjacent to the provisional position $N^*$ are equal to 0.5. Similarly, the satisfaction degrees $\gamma Q1(j)$ for the positions $N^* \pm 2$ are equal to 0.25, and the satisfaction degrees $\gamma Q1(j)$ for the positions $N^* \pm 3$ are equal to 0.15. FIG. 5 indicates the satisfaction degrees $\gamma Q1(j)$ of the basic fuzzy set theory rule Q1 for the four operating positions (1ST, 2ND, 3RD and O/D) where the provisional position $N^*$ is the third-speed position 3RD. In FIG. 5, numerals 1, 2, 3 and 4 indicate the first-speed, second-speed, third-speed and overdrive positions 1ST, 2ND, 3RD and O/D which are selectively established while the shift lever is placed in the drive position D. In the present embodiment, the portions of the microcomputer 32 assigned to execute steps S1 and S2 constitute means for determining the satisfaction degrees $\gamma Q1(j)$ of the fuzzy set theory rule for the operating positions of the transmission, based on the predetermined shift pattern.

Then, the control flow goes to step S3 in which the variable "j" is set to "1". Step S3 is followed by step S4 in which a difference $\Delta N$ between "j" and N (currently selected position) is calculated. Step S5 is then executed to calculate satisfaction degree $\gamma R(j)$ of fuzzy set control rules for the four operating positions of the transmission, depending upon the currently detected running condition of the vehicle. More specifically, different fuzzy set control rules R1, R2, R3 and R4 are used depending upon the value of the calculated difference $\Delta N$. The control rules R1–R4 use sub-rules A, B, B', C, D, E, F, G and H, as indicated below:

```
R1 = A and B and C
R2 = A and B' and C and {(D and E) or (F and G)}
R3 = A and B' and C and F and G
R4 = A and B' and C and (D or H)
```

The control rule R1 is used where $\Delta N = 0$, to check the vehicle running condition in which the currently established position N should be maintained or not. The control rule R2 is used where $\Delta N = +1$, to check the vehicle running condition in which the transmission should be shifted up by one position from the current position N. The control rule R3 is used where $\Delta N = +2$ or $+3$, to check the vehicle running condition in which the transmission should be shifted up by two or three positions from the current position N. The control rule R4 is used where $\Delta N = -1, -2$ or $-3$, to check the vehicle running condition in which the transmission should be shifted down by one, two or three positions from the current position N.

The sub-rules A, B, B', C, D, E, F, G and H will be described.

SUB-RULE A

Possible to provide desired vehicle drive torque $T_D*$

Figure 6:
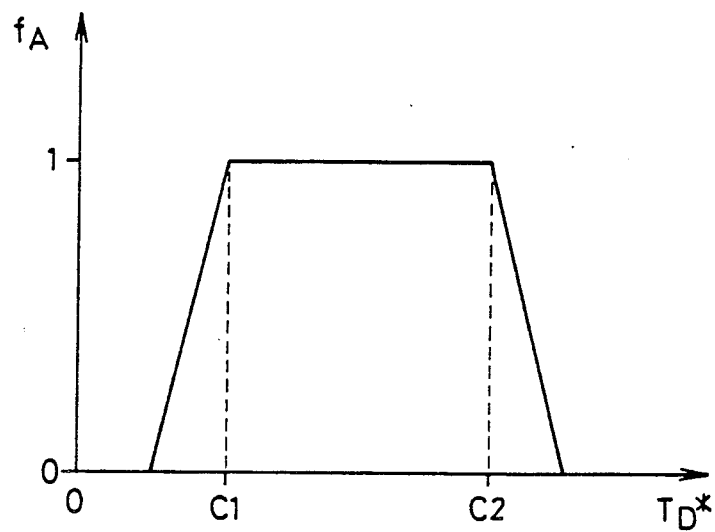
FIGS. 6 through 11 are graphs indicating examples of fuzzy set membership functions of sub-rules of control rules used in step S5 of the flow chart of FIG. 3.
Figure 12:
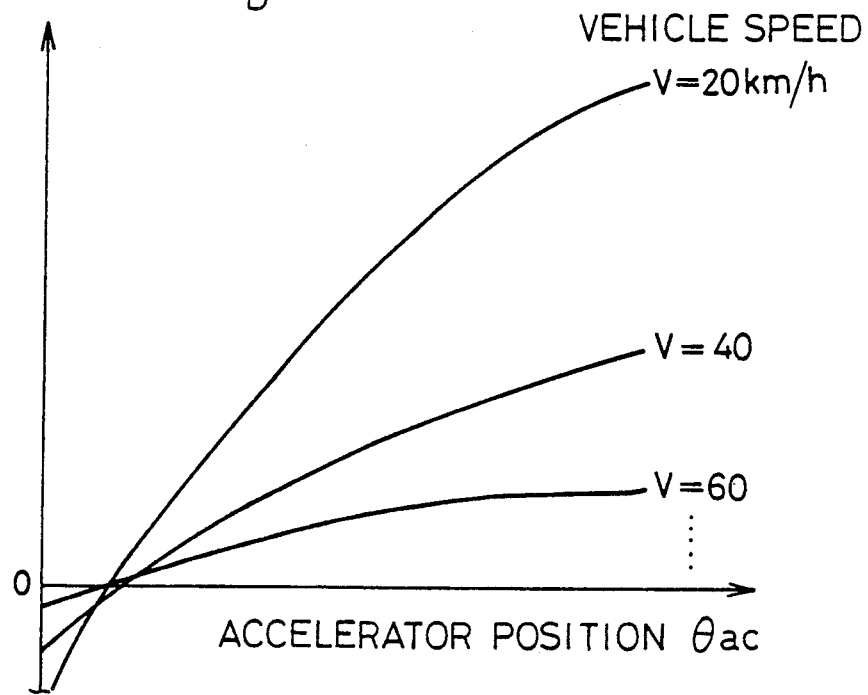
FIG. 12 is a graph showing an example of a relationship for determining a desired vehicle drive torque.

The vehicle drive torque that is produced in each operating position of the transmission is determined by the characteristics of the engine. The sub-rule A is used to determine whether the determined desired or target vehicle drive torque $T_D*$ is equal to or smaller than the maximum torque that can be produced in the relevant selected position of the transmission. An example of a membership function $f_A(T_D*)$ which indicates the degree of satisfaction of the sub-rule A is illustrated in FIG. 6. Threshold values C1 and C2 are predetermined by calculation or based on experimental data and stored in the microcomputer 32, for each of the operating positions of the transmission which are represented by the variable "j". The logical value of the membership function $f_A(T_D*)$ is between "0" and "1" (inclusive). The sub-rule A is completely satisfied when the value of the membership function is "1". This applies to other membership functions which will be described. It is noted that the desired vehicle drive torque $T_D*$ is determined by a predetermined relationship between the value $T_D*$ and the vehicle speed V and accelerator pedal position $\theta$ac, as indicated in FIG. 12 by way of example. This relationship is represented by data map stored in the read-only memory of the microcomputer 32.

SUB-RULE B

Presumed engine output speed Ne' close to desired speed Ne*

Figure 7:
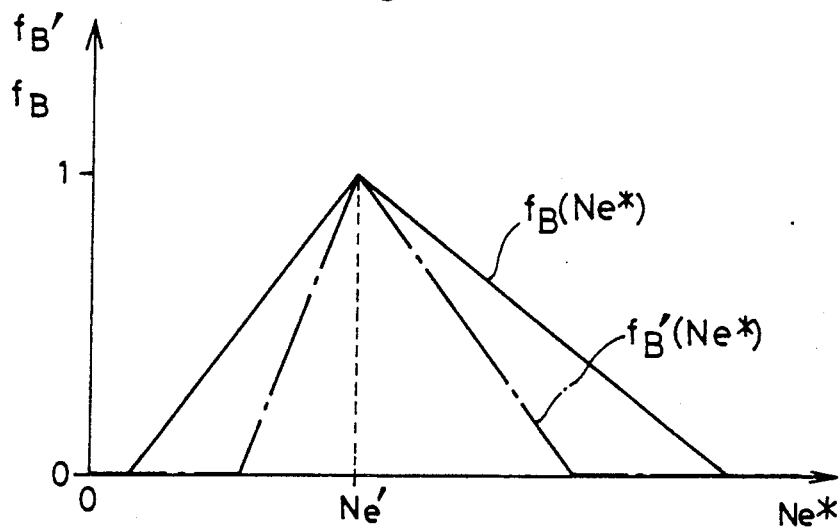
Figure 13:
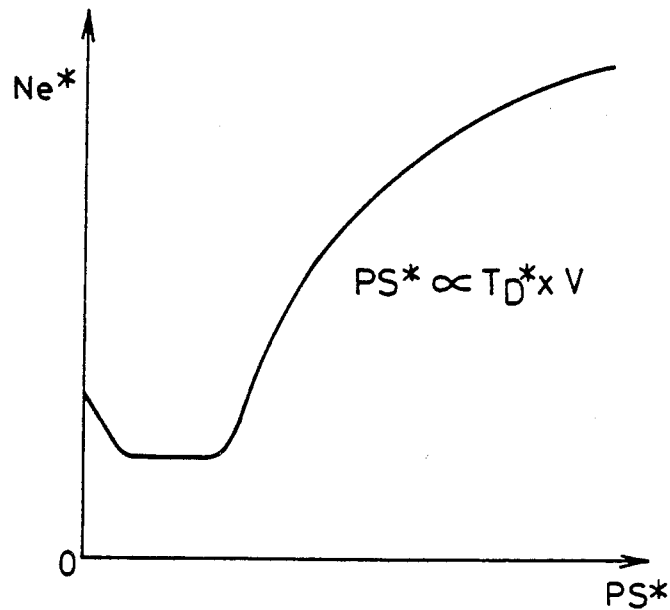
FIG. 13 is a graph showing an example of a relationship for determining a desired engine speed.

This sub-rule B is provided to select the optimum operating position of the transmission, based on the determined desired speed Ne*, in the case where the desired vehicle drive torque $T_D*$ is relatively small and can be produced in every one of the operating positions of the transmission. To this end, a presumed speed Ne' of the engine output shaft 16 (i.e., engine speed) is determined for each of the operating positions (represented by the variable "j"), as a function of the vehicle speed V or speed ratio of the operating positions. To select the optimum operating position, a determination is made for each operating position, as to whether the determined desired speed Ne* falls within a predetermined range whose center is the presumed speed Ne'. An example of a membership function $f_B(Ne*)$ indicative of the degree of satisfaction of this sub-rule B is indicated in solid lines in FIG. 7. The desired speed Ne* is determined by a predetermined relationship between the value Ne* and a desired horsepower PS (proportional to desired drive torque $T_D*$ x vehicle speed V), as indicated in FIG. 13 by way of example. This relationship is predetermined for an optimum compromise between the fuel economy and operating stability (freedom from knocking) of the engine, and is represented by data map stored in the microcomputer 32.

SUB-RULE B'

Presumed engine output speed Ne' very close to desired speed Ne*

This sub-rule B' is substantially the same as the above sub-rule B, but uses a membership function $f_{B'}(Ne*)$ different from that of the sub-rule B, so as to determine whether the desired speed Ne* falls within a predetermined range narrower than that of the sub-rule B. This sub-rule B' is used to determine whether the transmission should be shifted from the current position to another. An example of the membership function $f_{B'}(Ne*)$ which represents the satisfaction degree of this sub-rule B' is indicated in one-dot chain lines in FIG. 7.

SUB-RULE C

Presumed speed Ne' falling within a permissible range

Figure 8:
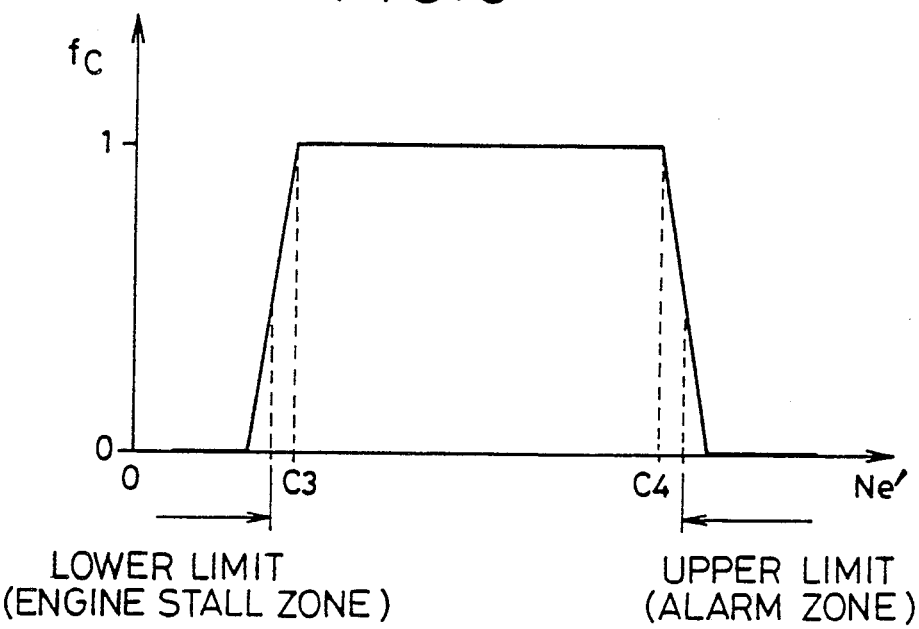

This sub-rule C is provided to protect the engine against abnormal or undesired operating conditions. More specifically, the engine may stall if the engine speed Ne is too low, and may be overrun if the engine speed is too high. To avoid this abnormal conditions or maintain the engine speed Ne within a permissible or safe-running range, the sub-rule C is used to determine whether the presumed output shaft speed Ne' falls within the permissible range. An example of a membership function $f_C(Ne')$ representing the satisfaction degree of this sub-rule C is illustrated in FIG. 8. Threshold values C3 and C4 indicated in FIG. 8 are predetermined depending upon the specific operating characteristics of the engine.

SUB-RULE D

Accelerator position kept constant

Figure 9:
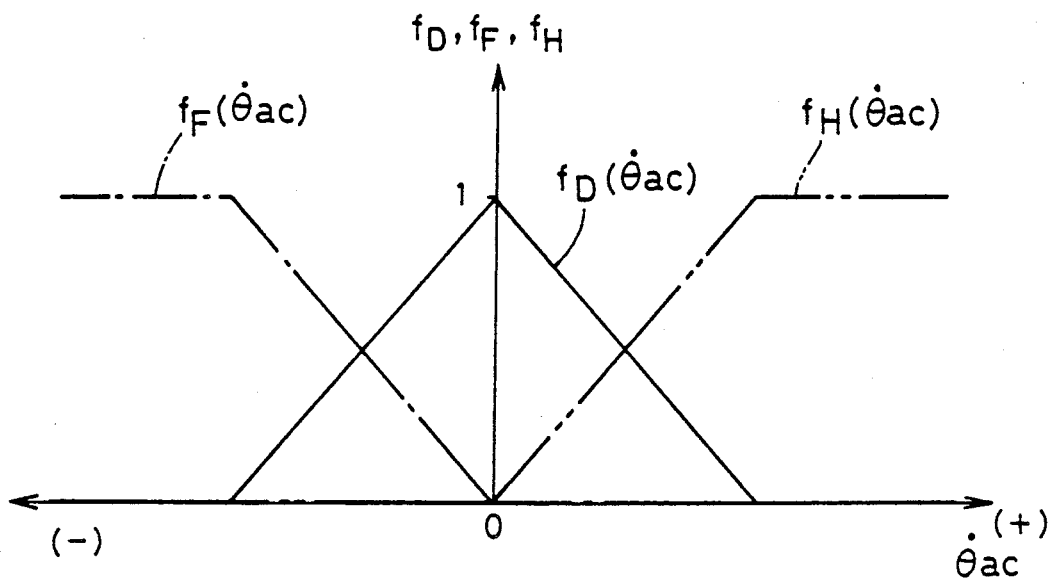

The accelerator position $\theta$ac corresponding to the angle of opening of the engine throttle valve represents the engine output required by the vehicle driver, namely, the driver's intention to shift the transmission. A change of the accelerator position can be detected based on a rate $\dot{\theta}$ac ($d\theta$ac/dt) of change of the accelerator position $\theta$ac. This sub-rule D is used to determine whether the accelerator pedal position is kept constant, that is, whether the vehicle driver wishes to maintain the currently established operating position of the transmission, or not. An example of a membership function $f_D(\dot{\theta}ac)$ which represents the satisfaction degree of the sub-rule D is illustrated in solid line in FIG. 9.

SUB-RULE E

Time T after the last shifting action exceeding a predetermined threshold

Figure 10:
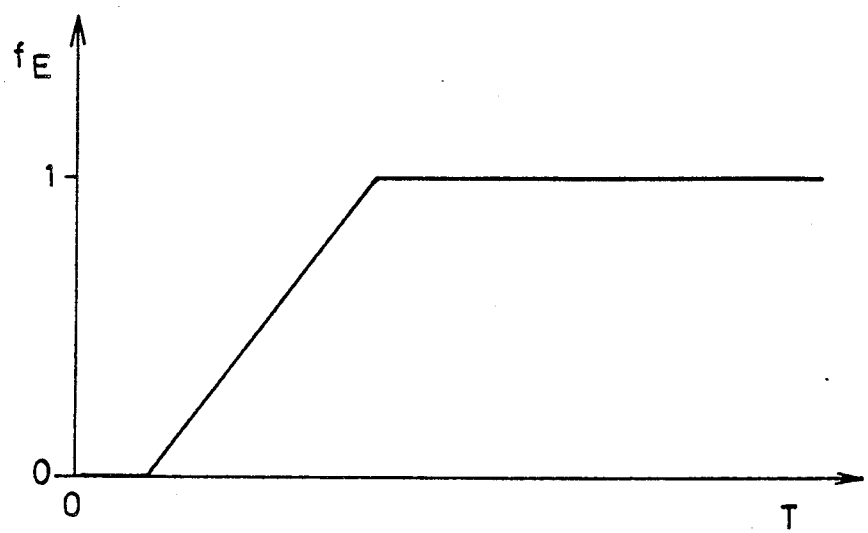

This sub-rule E is provided to avoid frequent shifting actions of the transmission at excessively short time intervals. An example of a membership function $f_E(T)$ representing the satisfaction degree of this sub-rule E is illustrated in FIG. 10.

SUB-RULE F

Rapid accelerator pedal release

This sub-rule F is provided to determine whether the accelerator pedal is rapidly released, or not, namely, whether the rate $\dot{\theta}$ac of change of the accelerator position $\theta$ac in the negative position (toward the non-operated position) exceeds a predetermined threshold, or not. An example of a membership function $f_F(\dot{\theta}ac)$ representing the satisfaction degree of this sub-rule F is illustrated in one-dot chain line in FIG. 9.

SUB-RULE G

Vehicle not running on a curved road

Figure 11:
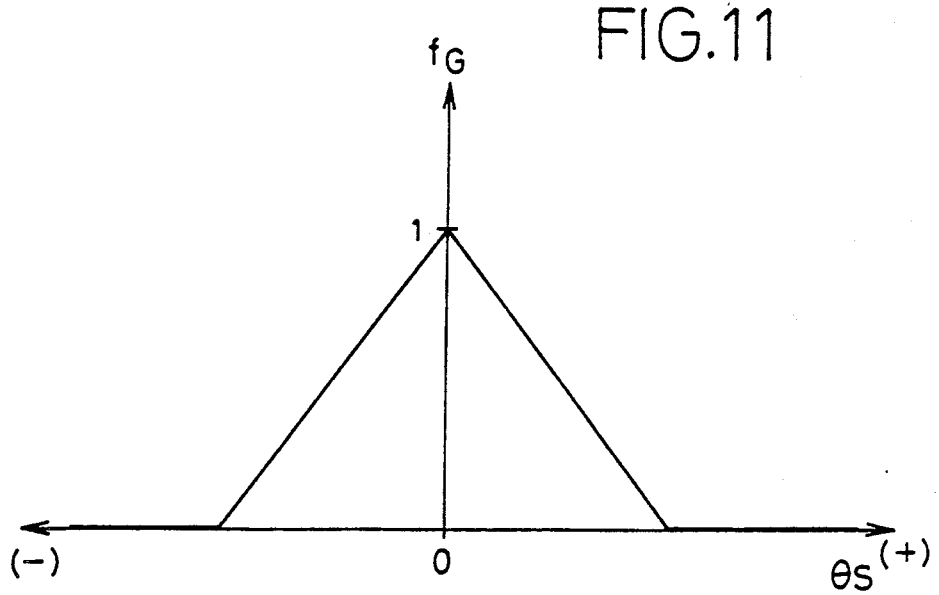

This sub-rule is provided to avoid a shift-up operation of the transmission upon releasing of the accelerator pedal when the vehicle curves. If the steering angle $\theta$s is smaller than a predetermined threshold, this means that the vehicle is not running along a curve. An example of a membership function $f_G(\theta s)$ representing the satisfaction degree of this sub-rule G is illustrated in FIG. 11.

SUB-RULE H

Rapid accelerator pedal depression

This sub-rule H is provided to determine whether the accelerator pedal is rapidly depressed or not, namely, whether the rate $\dot{\theta}ac$ of change in the accelerator position $\theta ac$ in the positive direction (toward the fully operated position) is larger than a predetermined threshold. An example of a membership function $f_H(\dot{\theta}ac)$ representing the satisfaction degree of this sub-rule H is illustrated in two-dot chain lines in FIG. 9.

According to the fuzzy set theory, "and" represents an algebraic multiplication (ordinary multiplication), or a minimum operation, and "or" represents a logical sum or a maximum operation. Where the "and" and "or" represent the algebraic multiplication and the maximum operation, respectively, satisfaction degrees $\gamma R(j)$ of the fuzzy set control rules R1, R2 R3 and R4 are obtained from the following equations (1), (2), (3) and (4), respectively:

$$\gamma R(j) = f_A(T_D^*) \times f_B(Ne^*) \times f_C(Ne') \quad (1)$$
$$\gamma R(j) = f_A(T_D^*) \times f_{B'}(Ne^*) \times f_C(Ne') \times \max\{f_D(\dot{\theta}ac) \times f_E(T), f_F(\dot{\theta}ac) \times f_G(\theta s)\} \quad (2)$$
$$\gamma R(j) = f_A(T_D^*) \times f_{B'}(Ne^*) \times f_C(Ne') \times f_F(\dot{\theta}ac) \times f_G(\theta s) \quad (3)$$
$$\gamma R(j) = f_A(T_D^*) \times f_{B'}(Ne^*) \times f_C(Ne') \times \max\{f_D(\dot{\theta}ac), f_H(\dot{\theta}ac)\} \quad (4)$$

Figure 3:
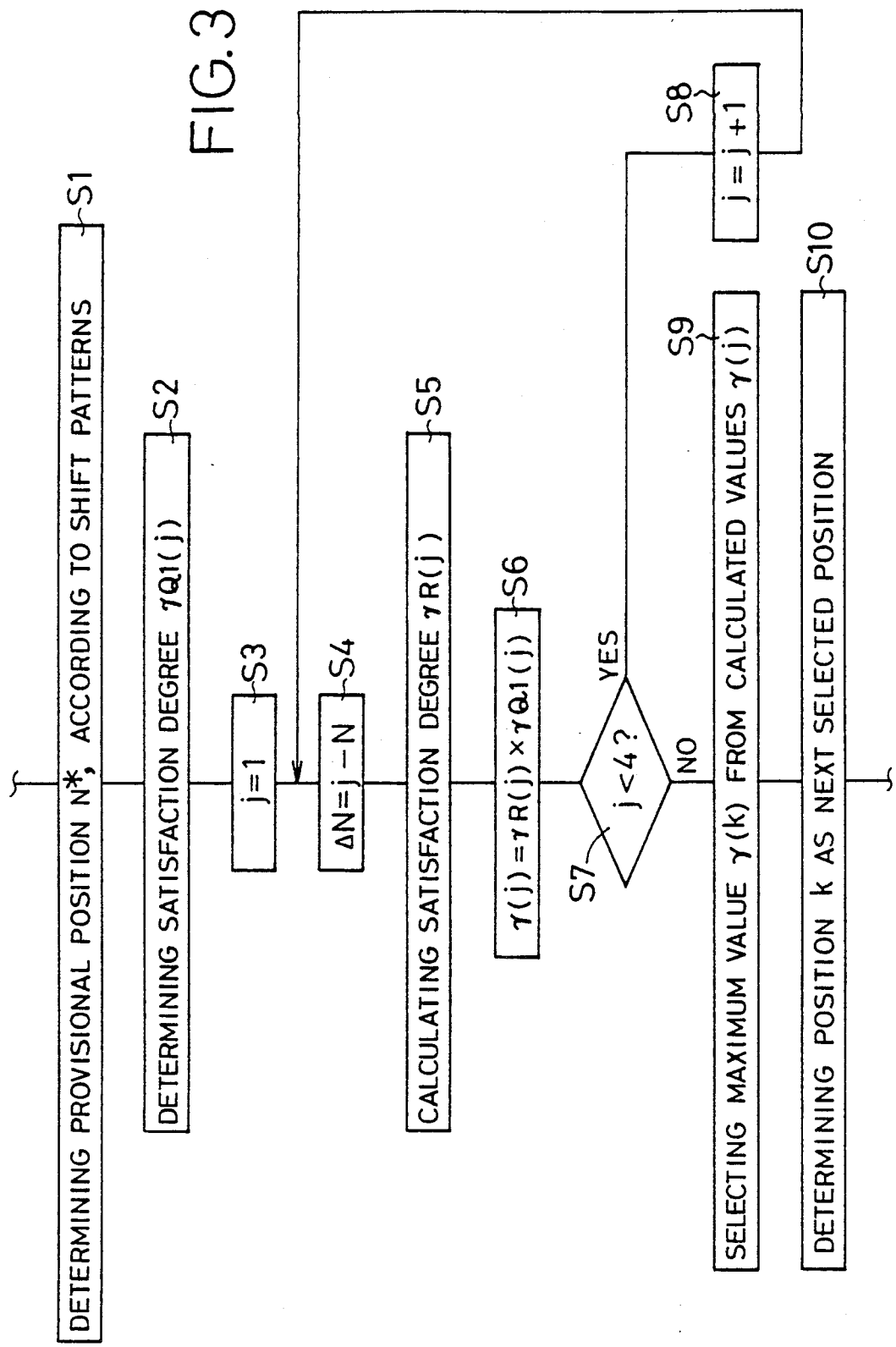
FIG. 3 is a flow chart illustrating an operation of the control apparatus for controlling the transmission of FIG. 1.

In the case where $j=1$, and N (currently established position) $=3$, the difference $\Delta N$ between j and N is equal to "$-2$", whereby the satisfaction degree $\gamma R(1)$ of the fourth control rule R4 is calculated in step S5 of the flow chart of FIG. 3, according to the corresponding equation (4).

Then, the control flow goes to step S6 to calculate the overall satisfaction degree $\gamma(1)$, according to the following equation (5), by algebraic multiplication of the satisfaction degree $\gamma R(1)$ obtained in step S5 and the satisfaction degree $\gamma Q1(1)$ obtained in step S2. The calculated overall satisfaction degree $\gamma(1)$ means the degree of adequacy in which the transmission should be shifted from the current position N to the first-speed position 1ST.

$$\gamma(j) = \gamma R(j) \times \gamma Q1(j) \quad (5)$$

Step S6 is followed by step S7 to determine whether the variable "j" is smaller than "4" or not. If the variable "j" is smaller than "4", the control flow goes to step S8 to increment the variable "j", and returns to step S4. Steps S4 through S8 are repeatedly executed until the variable "j" becomes equal to "4". In this manner, the overall satisfaction degrees $\gamma(1)$, $\gamma(2)$, $\gamma(3)$ and $\gamma(4)$ for selecting the positions 1ST, 2ND, 3RD and O/D of the transmission are calculated one after another.

More specifically, where $j=2$, the difference $\Delta N$ is equal to "$-1$". Consequently, the satisfaction degree $\gamma R(2)$ of the control rule R4 for selecting the second-speed position 2ND is calculated in step S5 according to the equation (4), and the overall satisfaction degree $\gamma(2)$ for selecting the second-speed position 2ND is calculated in step S6 according to the above equation (5). Where $j=3$, the difference $\Delta N$ is equal to "0", and the satisfaction degree $\gamma R(3)$ of the control rule R1 for selecting the third-speed position 3RD is calculated in step S5 according to the equation (1). The overall satisfaction degree $\gamma(3)$ for the third-speed position 3RD is calculated in step S6 according to the above equation (5). Where $j=4$, the difference $\Delta N$ is equal to "$+1$", and the satisfaction degree $\gamma R(4)$ of the control rule R2 for selecting the overdrive position O/D is calculated in step S5 according to the equation (2). The overall satisfaction degree $\gamma(4)$ for the overdrive position O/D is calculated in step S6 according to the above equation (5).

Figure 14:
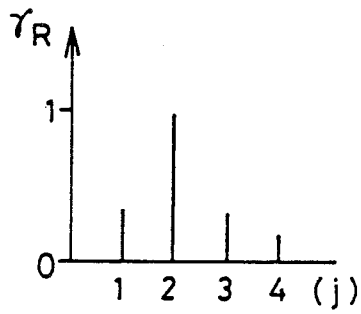
FIG. 14 is a view indicating control rule satisfaction degrees determined in step S5 of the flow chart of FIG. 3.
Figure 15:
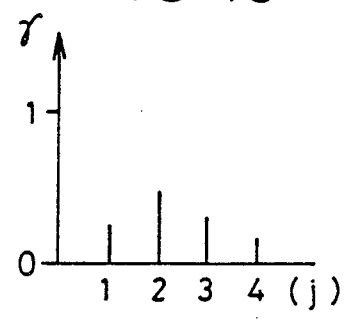
FIG. 15 is a view indicating the overall satisfaction degrees determined in step S6 of the flow chart of FIG. 3.

An example of the satisfaction degrees $\gamma R(j)$ calculated in step S5 is indicated in FIG. 14, and an example of the overall satisfaction degrees $\gamma(j)$ calculated in step S6 is indicated in FIG. 15. In the present embodiment, the portions of the microcomputer 32 assigned to execute step S5 constitute first calculating means for calculating the satisfaction degrees $\gamma R(j)$ of fuzzy set control rules for the different operating positions of the transmission, depending upon the running condition of the vehicle. Further, the portions of the microcomputer 32 assigned to execute step S6 constitute second calculating means for calculating overall satisfaction degrees $\gamma(j)$ for selecting the operating positions, based on the satisfaction degrees $\gamma Q1(j)$ determined in step S2, and the satisfaction degrees $\gamma R(j)$ calculated in step S5.

In the present example wherein the currently established position N of the transmission is the third-speed position 3RD, the control rule R3 for the difference $\Delta N = 2$ or 3 is not used. However, this control rule R3 is used for calculating the satisfaction degree for selecting the third-speed or overdrive position 3RD or O/D, where the transmission is currently placed in the first-speed or second-speed position 1ST or 2ND.

When the variable "j" becomes equal to "4" as a result of repetition of steps S4 through S8, a negative decision (NO) is obtained in step S7, and the control flow goes to step S9 in which the highest or maximum overall satisfaction degree $\gamma(k)$ is selected from the four values $\gamma(j)$ calculated in step S6. In the example of FIG. 15, the overall satisfaction degree $\gamma(2)$ is selected as the highest satisfaction degree $\gamma(k)$. Namely, "k" is determined as "2". In the next step S10, the second-speed position 2ND represented by $k=2$ is determined as the position to which the transmission is shifted from the current position N (third-speed position 3RD). According to this determination, the solenoid coils Nos. 1 and 2 are both energized to shift down the planetary gear mechanism 12 from the third-speed position 3RD to the second-speed position 2ND. Portions of the microcomputer 32 assigned to execute steps S9 and S10 constitute means for determining, based on the determined highest overall satisfaction degree $\gamma(k)$, the position to which the transmission (10, 12) is shifted.

In the control apparatus 14 including the microcomputer 32 and the hydraulic control device 30, satisfaction degrees $\gamma Q1(j)$ of the basic fuzzy set theory rule Q1 are determined in steps S1 and S2, for each of the operating positions of the transmission, based on the predetermined shift pattern. Further, the satisfaction degrees $\gamma R(j)$ of the control rules R1-R4 are determined in step S5, for the individual operating positions, depending upon the running condition of the vehicle (represented by the satisfaction degrees of the sub-rules). Based on the obtained satisfaction degrees $\gamma Q1(j)$ and $\gamma R(j)$, the overall satisfaction degrees $\gamma(j)$ for selecting the individual positions of the transmission are calculated in step S6. Based on the highest value $\gamma(k)$ of the calculated overall satisfaction degrees $\gamma(j)$ is determined in step S9, and one of the positions of the transmission is determined in step S10 as the position to be established next, i.e., as the position to which the transmission is shifted from the current position. Therefore, the present control apparatus 14 permits the transmission to be shifted to the most optimum position, depending upon the various running parameters of the vehicle (which collectively define the running condition), which cannot be dealt with by the arrangement adapted to control the transmission based on only predetermined shift patterns which use the accelerator position $\theta ac$ and vehicle running speed V as the control parameters.

Further, the present control apparatus 14 which relies on both the shift patterns and the fuzzy set control rules as explained above requires a reduced amount of control program data, as compared with an arrangement which uses many shift patterns and pattern compensating maps to control the transmission depending upon many running parameters of the vehicle. Where the control rules are used to monitor the vehicle running parameters for determining the position of the transmission to be established next, the required amount of control data is proportional to the number of the parameters. Where the shift patterns or compensating maps are provided corresponding to many different running conditions (combinations of running parameters) of the vehicle, the number of the required patterns or compensating maps is proportional to the number of the running parameters raised to n-th power. Accordingly, the required amount of control program data exponentially increases as the number of the parameters increases for improving the shift control accuracy of the transmission.

Figure 16:
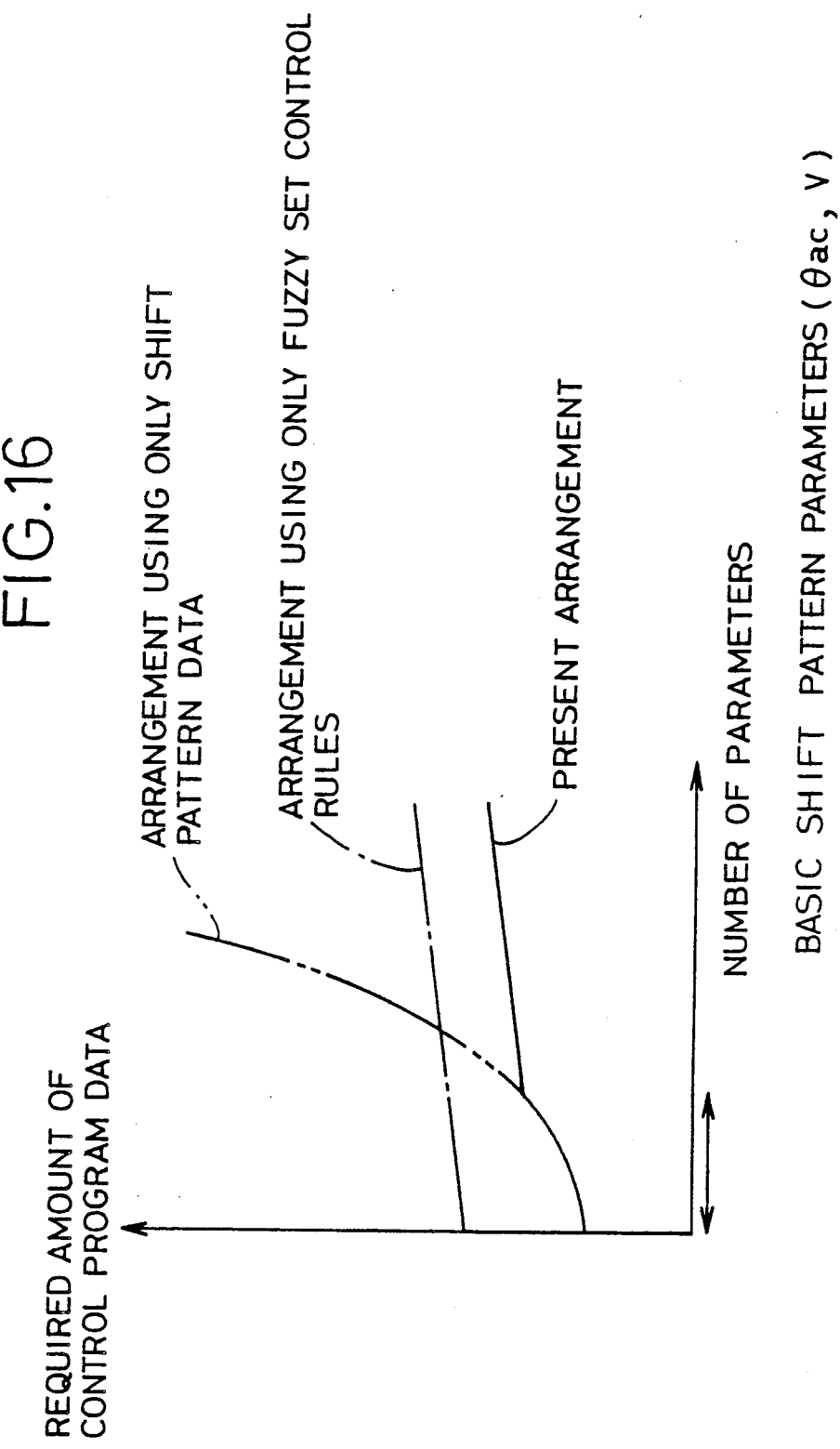
FIG. 16 is a view showing an increase in the volume of program data with an increase in the number of control parameters, according to the present invention, as compared with those according to the comparative arrangements.

It is also noted that the present control apparatus 14 uses the two shift patterns, one for the drive position D of the shift lever, and the other for the second position 2. Each shift pattern is formulated with the vehicle speed V and accelerator position $\theta ac$ used as the two basic parameters. This arrangement reduces the required overall amount of control program data, as compared with the arrangement which uses only the fuzzy set control rules. The graph in FIG. 16 shows the required amounts of control program data, in relation to the number of the running parameters of the vehicle used for controlling the transmission. Solid line indicates the amount required by the control apparatus 14 of the present invention, while one-dot chain line indicates the amount required by the arrangement which uses only the fuzzy set control rules. Two-dot chain line indicates the amount required by the arrangement which uses only the shift patterns and pattern compensating data maps.

In the present control apparatus 14, the overall satisfaction degrees $\gamma(j)$ for all the selectable operating positions of the transmission are calculated, and the position to be established next is selected based on the highest satisfaction degree $\gamma(j)$. This arrangement does not require a procedure otherwise required for improving the control accuracy, as practiced in the arrangement wherein the shift patterns are compensated or modified by obtaining the center of distribution of the calculated satisfaction degrees of the fuzzy set control rules. In this respect, too, the present control apparatus 14 reduces the required amount of the control program data. However, the present control apparatus may be modified to determine the optimum shift position of the transmission, in consideration of the center of the one-dimensional or two-dimensional distribution of the calculated satisfaction degrees $\gamma(j)$.

In the present control apparatus 14, the membership functions representing the satisfaction degrees of the sub-rules A, B, B' and C-H include a gradient or gradients as indicated in FIGS. 6-11, so that the manner of controlling the transmission may be adjusted so as to meet the driver's desire or intention, by suitably determining the gradient or gradients. In addition, the operation of the present control apparatus 14 adapted to control the transmission according to the fuzzy set theory is less likely to be significantly influenced by malfunction or trouble of any sensors 34, 36, 38, 40, 42 used to detect the running parameters (running condition) of the vehicle. Generally, it is difficult to accurately detect the rate $\dot\theta ac$ of change of the accelerator position $\theta ac$. However, the determination of the next selected shift position k according to the fuzzy set theory is not considerably affected by an error in the measurement of the rate.

Figure 17:
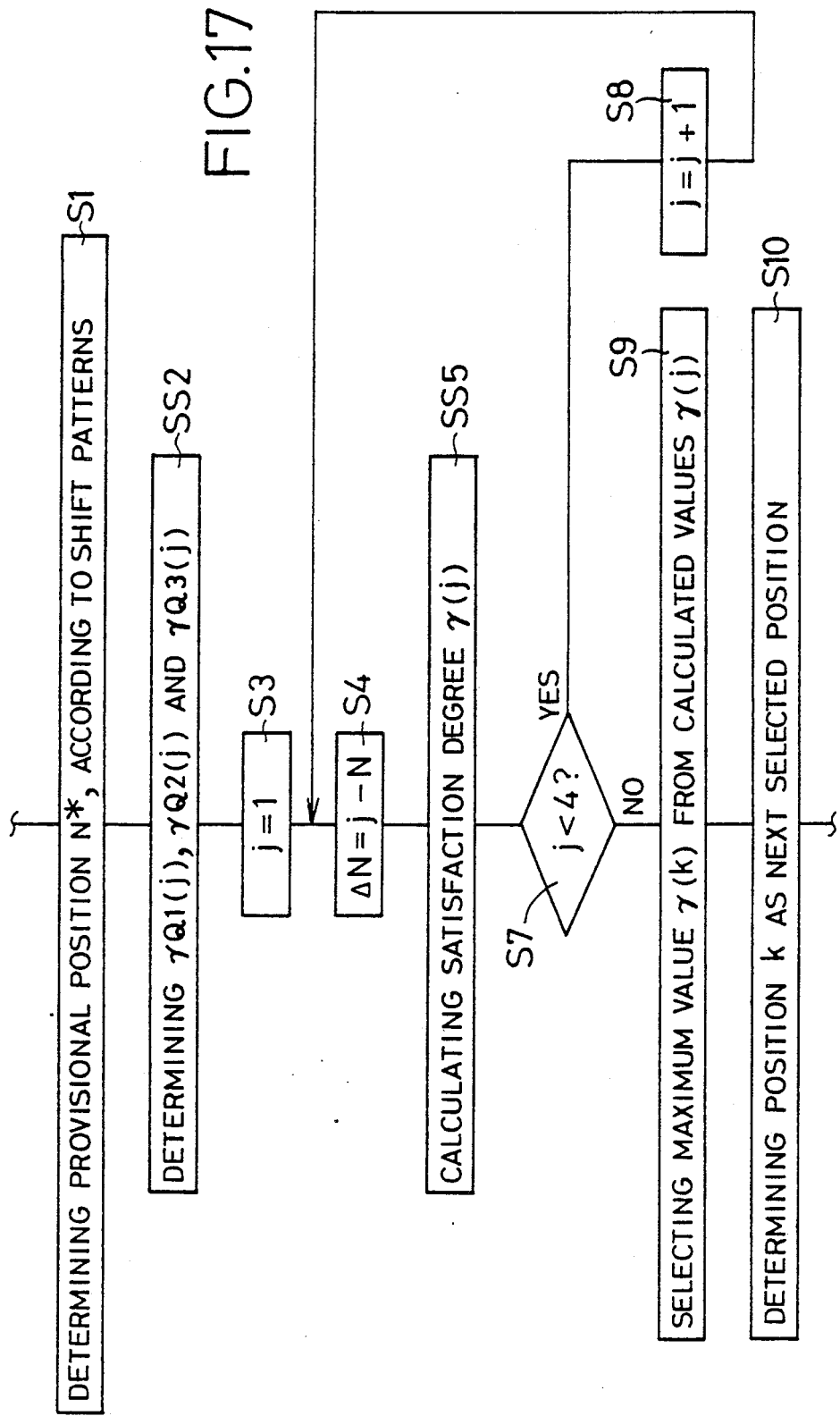
FIG. 17 is a flow chart showing another embodiment of the present invention.

Referring next to FIG. 17, another embodiment of the present invention will be described. The control program used in this embodiment is different from that in the preceding embodiment, only in terms of steps SS2 and SS5. Step SS2 is substituted for step S2, while step SS5 is substituted for steps S5 and S6. In the interest of brevity and simplification, only these steps SS2 and SS5 will be described.

Figure 18:
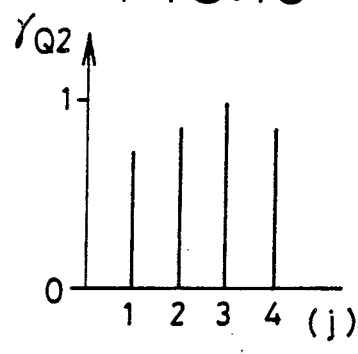
FIG. 18 and FIG. 19 are views indicating satisfaction degrees of different fuzzy set theory rules for the respective operating positions of the transmission, which are determined in step SS2 of the flow chart of FIG. 17.
Figure 19:
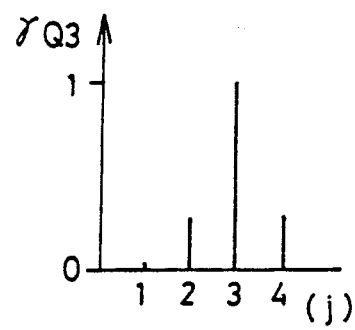

In step SS2' satisfaction degrees $\gamma Q1(j)$, $\gamma Q2(j)$ and $\gamma Q3(j)$ of respective three basic fuzzy set theory rules Q1, Q2 and Q3 are determined for each of the selectable operating positions of the transmission. The basic fuzzy set theory rule Q1 is the same as described above with respect to the preceding embodiment. Namely, the satisfaction degrees $\gamma Q1(j)$ of the rule Q1 are determined as indicated in FIG. 5, depending upon whether each of the selectable positions of the transmission is close to the determined provisional position N*. The satisfaction degrees $\gamma Q2(j)$ of the basic fuzzy set theory rule Q2 are determined depending upon whether each selectable position of the transmission is more or less close to the provisional position N*. The satisfaction degrees $\gamma Q3(j)$ of the basic fuzzy set theory rule Q3 are determined depending upon whether each selectable position is very close to the provisional position N*. Examples of the satisfaction degrees $\gamma Q2(j)$ and $\gamma Q3(j)$ of the rules Q2 and Q3 where the third-speed position 3RD is the provisional position N* are illustrated in FIGS. 18 and 19, respectively. Namely, the values of the satisfaction degrees $\gamma Q2(1)$, $\gamma Q2(2)$ and $\gamma Q2(4)$ for the first-speed, second-speed and overdrive positions 1ST, 2ND and O/D are comparatively larger than the corresponding satisfaction degrees $\gamma Q1(1)$, $\gamma Q1(2)$ and $\gamma Q1(4)$, and the values of the satisfaction degrees $\gamma Q3(1)$, $\gamma Q3(2)$ and $\gamma Q3(4)$ for the first-speed, second-speed and overdrive positions 1ST, 2ND and O/D are comparatively smaller than the corresponding satisfaction degrees $\gamma Q1(1)$, $\gamma Q1(2)$ and $\gamma Q1(4)$.

Figure 20:
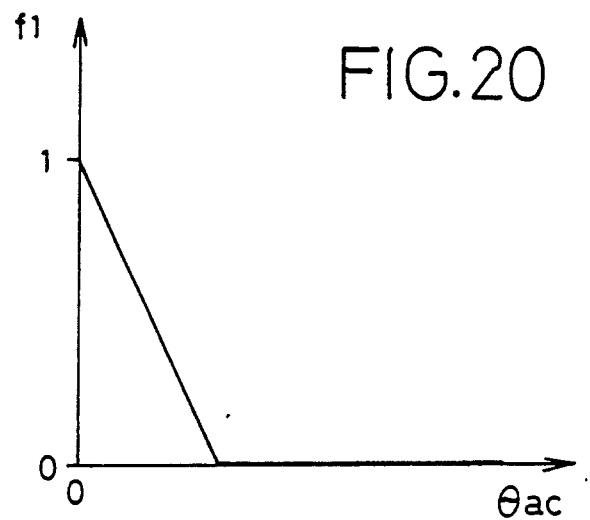
FIG. 20 is a view indicating an example of a fuzzy set membership function of the control rules used in step SS5 of FIG. 17.

In step SS5, overall satisfaction degrees $\gamma(j)$ of five complex control rules RI, RII, RIII, RIV and RV are determined for each selectable operating position of the transmission, depending upon the detected running condition (running parameters) of the vehicle. As indicated below, the complex control rules RI, RII, RIII, RIV and RV use the basic fuzzy set theory rules Q1, Q2 and Q3, as well as the fuzzy set control rules consisting of the sub-rules D, E, F, G and H (explained above) and an additional sub-rule I. Although the rule RI uses only the basic fuzzy set theory rule Q2, the rule RI is referred to as "complex control rule" for distinction from the fuzzy set control rules R1-R4 used in the first embodiment. The sub-rule I is used to determine whether the accelerator pedal is positioned at the non-operated position (corresponding to the fully closed position of the throttle valve). An example of a membership function $f_I(\theta ac)$ representing the satisfaction degree of the sub-rule I is illustrated in FIG. 20. The complex control rule RI is used where $\Delta N=0$, to check the vehicle running condition in which the currently established position N should be maintained or not. The complex control rule RII is used where $\Delta N= +1$, to check the vehicle running condition in which the transmission should be shifted up by one position from the current position N. The complex control rule RIII is used where $\Delta N= +2$ or $+3$, to check the vehicle running condition in which the transmission should be shifted up by two or three positions from the current position N. The complex control rule RIV is used where $\Delta N= -1$, to check the vehicle running condition in which the transmission should be shifted down by one position from the current position N. The complex control rule RV is used where $\Delta N= -2$ or $-3$, to check the vehicle running condition in which the transmission should be shifted down by two or three positions from the current position N.

```
RI   = Q2
RII  = Q1 and {(D and E) or F}
RIII = Q3 and F
RIV  = Q1 and (H or I)
RV   = Q3 and G and H
```

Where "and" and "or" represent the algebraic multiplication and maximum operation, respectively, the satisfaction degrees $\gamma(j)$ of the complex control rules RI-RV are obtained from the following equations (6), (7), (8), (9) and (10), respectively:

$$\gamma(j) = \gamma Q2(j) \tag{6}$$
$$\gamma(j) = \gamma Q1(j) \times \max\{f_D(\theta ac) \times f_E(T), f_F(\theta ac)\} \tag{7}$$
$$\gamma(j) = \gamma Q3(j) \times f_F(\theta ac) \tag{8}$$
$$\gamma(j) = \gamma Q1(j) \times \max\{f_H(\theta ac) \times f_I(\theta ac)\} \tag{9}$$
$$\gamma(j) = \gamma Q3(j) \times f_G(\theta s) \times f_H(\theta ac) \tag{10}$$

In the case where N (currently established position) $=3$, and $j=1$, the difference $\Delta N$ between j and N is equal to "$-2$", whereby the satisfaction degree $\gamma(1)$ of the complex control rule RV is calculated according to the corresponding equation (10). Where $j=2$, the difference $\Delta N$ is equal to "$-1$". Consequently, the satisfaction degree $\gamma(2)$ of the complex control rule RIV for selecting the second-speed position 2ND is calculated according to the equation (9). Where $j=3$, the difference $\Delta N$ is equal to "0", and the satisfaction degree $\gamma(3)$ of the complex control rule RI for selecting the third-speed position 3RD is calculated according to the equation (6). Where $j=4$, the difference $\Delta N$ is equal to "$+1$", and the satisfaction degree $\gamma(4)$ of the control rule RII for selecting the overdrive position O/D is calculated according to the equation (7).

After the satisfaction degrees $\gamma(1)$, $\gamma(2)$, $\gamma(3)$ and $\gamma(4)$ have been calculated in step SS5 and a negative decision (NO) is obtained in step S7, the control flow goes to step S9 in which the highest value $\gamma(k)$ is selected from the calculated four satisfaction degrees in step S9, and then goes to step S10 for determining the position k as the position to which the transmission is shifted. It will be understood, however, that where the provisional position N* determined based on the appropriate shift pattern is the currently established position N, the satisfaction degree $\gamma(j)$ of the complex control rule RI is "1", that is, the complex control rule RI is completely satisfied, whereby the currently established position N is maintained, irrespective of the detected running condition of the vehicle (represented by the sub-rules).

The present embodiment of FIG. 17 provides the same advantages as the preceding embodiment of FIG. 3. In addition, the use of the three basic fuzzy set theory rules Q1, Q2 and Q3 to obtain the satisfaction degrees $\gamma Q1(j)$, $\gamma Q2(j)$ and $\gamma Q3(j)$ permits the transmission to be controlled in a manner that more suitably meets the driver's desire or taste. Further, the overall satisfaction degrees $\gamma(j)$ of the complex control rules RI, RII, RIII, RIV and RV which include one of the three fuzzy set theory rules Q1, Q2, Q3 are calculated in one step in step SS5. Accordingly, the required amount of control program data is further reduced.

In the present modified embodiment, the portions of the microcomputer 32 assigned to execute steps S1 and SS2 constitute means for determining the satisfaction degrees $\gamma QI(j)$, $\gamma Q2(j)$ and $\gamma Q3(j)$, based on the predetermined shift pattern. Further, the portions of the microcomputer 32 assigned to execute step SS5 serve as first calculating means for calculating the satisfaction degrees of the sub-rules D through I, depending upon the running condition of the vehicle. The portions of the microcomputer 32 assigned to execute step SS5 also serve as second calculating means for calculating the overall satisfaction degrees $\gamma(j)$, by multiplying the satisfaction degrees calculated by the first calculating means, by the satisfaction degrees $\gamma Q1(j)$, $\gamma Q2(j)$ and $\gamma Q3(j)$ determined in step SS2 by the determining means. Thus, it will be understood that the sub-rules D through I of the complex control rules RI-RV correspond to the fuzzy set control rules R1-R4 of the preceding embodiment.

While the present invention has been described in its presently preferred embodiments, it is to be understood that the invention is not limited to the details of the illustrated embodiment, and may be otherwise embodied.

Figure 21:
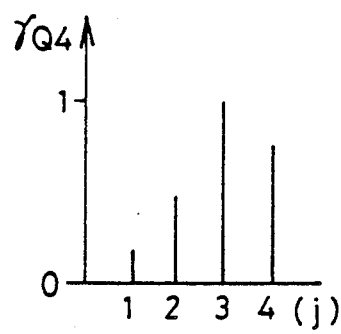
FIG. 21 and FIG. 22 are graphs indicating satisfaction degrees of fuzzy set theory rules different from those of FIGS. 5, 18 and 19.
Figure 22:
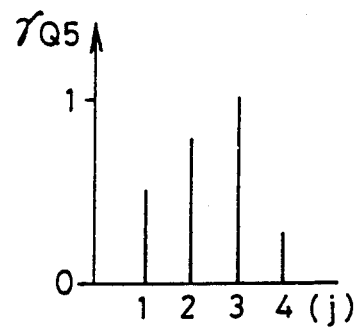

While the preceding embodiment uses the three basic fuzzy set theory rules Q1, Q2 and Q3 as illustrated in FIGS. 5, 18 and 19, it is possible to use other basic fuzzy set theory rules such as Q4 and Q5 as illustrated in FIGS. 21 and 22, respectively. The basic fuzzy set theory rule Q4 is formulated so as to give a larger weight to a high-gear position (overdrive position O/D) of the transmission which has a lower speed ratio than the determined provisional position N* (third-speed position 3RD, in the illustrated embodiment). On the other hand, the rule Q5 is formulated so as to give larger weights to low-gear positions of the transmission which have higher speed ratios than the provisional position N*.

In the illustrated embodiments, the logical values of the satisfaction degrees of the basic fuzzy set theory rules Q1, Q2, Q3 (Q4, Q5) are set to "1" for the provisional position N*, while those for the other positions are smaller than "1". The logical values of the satisfaction degrees of these rules may be set otherwise for improved accuracy, for example, according to arithmetic equations based on the actually detected vehicle running speed V and the reference values V1, V2, V3 used for the shift pattern.

In the illustrated embodiments, the shift pattern used for the shift lever position D is defined by 90°-stepped shift-up and shift-down boundaries represented in a rectangular coordinate system wherein the accelerator position θac and the vehicle speed V are taken along the mutually perpendicular axes, as indicated in FIG. 4. However, the shift pattern boundaries may be defined by straight, curved or other lines. Further, the shift pattern may use parameters other than the accelerator position θac and the vehicle speed V. The shift pattern may be modified or compensated according to a suitable data map, so as to meet the specific characteristics of the vehicle engine or the driver's taste, so that the provisional position N* is determined according to the compensated shift pattern.

Although the "and" and "or" used in the furry set control rules R1–R4 and complex control rules RI–RV represent the algebraic multiplication and the maximum operation, respectively, the "and" and "or" may be defined to represent other operations. Further, the fuzzy set control rules or complex control rules may use operators other than "and" and "or".

While the automatic transmission 10, 12 controlled by the control apparatus 14 of the illustrated embodiments has four forward drive positions and one rear drive position and is provided with the lock-up clutch $C_L$, the control apparatus according to the present invention may apply to other types of automatic transmission, whose planetary gear mechanism (12) is constructed otherwise to provide desired drive positions. The automatic transmission to which the present invention is applicable may be constructed without a lock-up clutch.

It will be understood that the invention may be embodied with various other changes, modifications and improvements, which may occur to those skilled in the art, without departing from the spirit and scope of the invention defined in the following claims.

What is claimed is:

1. An apparatus for controlling an automatic transmission for a motor vehicle having a plurality of operating positions, comprising:

detecting means for detecting a plurality of parameters corresponding to the running condition of the vehicle;

means for selecting a provisional operating position according to a predetermined shift pattern using at least two vehicle running condition parameters;

determining means for determining satisfaction degrees of at least one basic fuzzy set theory rule corresponding to said plurality of operating positions of the transmission, respectively, based on said provisional operating position;

first calculating means for calculating satisfaction degrees of fuzzy set control rules, corresponding to said plurality of operating positions, respectively, depending upon the running condition of the vehicle detected by said detecting means;

second calculating means for calculating overall satisfaction degrees for selecting said plurality of operating positions, respectively, based on the satisfaction degrees of said at least one basic fuzzy set theory rule determined by said determining means and the satisfaction degrees of said fuzzy set control rules calculated by said first calculating means; and selecting means for selecting one of said plurality of operating positions of the transmission, based on the overall satisfaction degrees calculated by said second calculating means, so that the automatic transmission is shifted to the selected operating position.

2. An apparatus according to claim 1, wherein said determining means provisionally selects one of said plurality of operating positions as the provisional position N* according to said predetermined shift pattern, and said at least one basic fuzzy set theory rule consists of a basic fuzzy set theory rule whose satisfaction degree decreases with a difference in the number of positions between each of said operating positions and said provisional position N*.

3. An apparatus according to claim 1, wherein said fuzzy set control rules whose satisfaction degrees are calculated by said first calculating means consist of a first control rule R1 for checking said running condition to determine whether said transmission should be maintained in a currently established position, a second control rule R2 for checking said running condition to determine whether said transmission should be shifted up one position from said currently established position, a third control rule R3 for checking said running condition to determine whether said transmission should be shifted up by two or three positions from said currently established position, and a fourth control rule R4 for checking said running condition to determine whether said transmission is shifted down by one position or two or three positions from said currently established position.

4. An apparatus according to claim 3, wherein said first, second, third and fourth control rules R1, R2, R3 and R4 are expressed by the following equations:

| R1 = A and B and C |
| --- |
| R2 = A and B' and C and {(D and E) or (F and G)} |
| R3 = A and B' and C and F and G |
| R4 = A and B' and C and (D or H) | where, "A" represents a sub-rule A for determining a degree in which said transmission is capable of providing a determined desired vehicle drive torque $T_D^*$, "B" represents a sub-rule B for determining a degree in which a presumed speed Ne' of an engine output shaft of the vehicle is close to a determined desired value Ne*, "B'" represents a sub-rule B' for determining a degree in which said presumed speed Ne' is very close to said desired value Ne*, "C" represents a sub-rule C for determining a degree in which said presumed speed Ne' falls within a permissible range, "D" represents a sub-rule D for determining a degree in which an accelerator pedal is kept at a constant position, "E" represents a sub-rule E for determining a degree in which a time T after a last shifting action of said transmission is long, "F" represents a sub-rule F for determining a degree in which said accelerator pedal is rapidly released, "G" represents a sub-rule G for determining a degree in which a steering angle of the vehicle is small, and "H" represents a sub-rule H for determining a degree in which said accelerator pedal is rapidly depressed.

5. An apparatus according to claim 1, wherein said second calculating means calculates said overall satisfaction degrees by obtaining an algebraic product of the satisfaction degrees of said at least one basic fuzzy set theory rule determined by said determining means and the satisfaction degrees of said fuzzy set control rules calculated by said first calculating means.

6. An apparatus according to claim 1, wherein said selecting means selects one of said plurality of operating positions of said transmission, whose overall satisfaction degree is the highest of all the overall satisfaction degrees calculated by said second calculating means.

7. An apparatus according to claim 1, wherein said fuzzy set control rules and said at least one basic fuzzy set theory rule are selectively combined to provide a plurality of complex control rules.

8. An apparatus according to claim 7, wherein said determining means provisionally selects one of said plurality of operating positions as the provisional position $N^*$ according to said predetermined shift pattern, and said at least one basic fuzzy set theory rule consists of a first basic fuzzy set theory rule Q1 for determining a degree in which each of said operating positions is close to said provisional position $N^*$, a second basic fuzzy set theory rule Q2 for determining a degree in which said each operating position is more or less close to said provisional position $N^*$, and a third basic fuzzy set theory rule Q3 for determining a degree in which said each operating position is very close to said provisional position $N^*$.

9. An apparatus according to claim 7, wherein said plurality of complex control rules are calculated by said first calculating means, and consist of a first complex control rule RI for checking said running condition to determine whether said transmission should be maintained in a currently established position, a second complex control rule RII for checking said running condition to determine whether said transmission should be shifted up one position from said currently established position, a third complex control rule RIII for checking said running condition to determine whether said transmission should be shifted up by two or three positions from said currently established position, a fourth complex control rule RIV for checking said running condition to determine whether said transmission is shifted down by one position from said currently established position, and a fifth complex control rule RV for checking said running condition to determine whether said transmission is shifted down by two or three positions from said currently established position.

10. An apparatus according to claim 9, wherein said first, second, third, fourth and fifth complex control rules RI, RII, RIII, RIV and RV are expressed by the following equations:

| |
|---|
| RI = Q2 |
| RII = Q1 and {(D and E) or F} |
| RIII = Q3 and F |
| RIV = Q1 and (H or I) |
| RV = Q3 and G and H | where, "D" represents a sub-rule D for determining a degree in which an accelerator pedal is kept at a constant position, "E" represents a sub-rule E for determining a degree in which a time T after a last shifting action of said transmission is long, "F" represents a sub-rule F for determining a degree in which said accelerator pedal is rapidly released, "G" represents a sub-rule G for determining a degree in which a steering angle of the vehicle is small, "H" represents a sub-rule H for determining a degree in which said accelerator pedal is rapidly depressed, and "I" represents a sub-rule I for determining a degree in which said accelerator pedal is placed at a non-operated position, said sub-rules D, E, F, G, H and I constituting said fuzzy set control rules.

* * * * *